(12) United States Patent
Koyama et al.

(10) Patent No.: US 12,155,346 B2
(45) Date of Patent: Nov. 26, 2024

(54) SOLAR ARRAY WING

(71) Applicant: Mitsubishi Electric Corporation, Tokyo (JP)

(72) Inventors: Tatsuya Koyama, Tokyo (JP); Hiroki Kobayashi, Tokyo (JP); Kazunori Takagaki, Tokyo (JP); Sohei Samejima, Tokyo (JP)

(73) Assignee: MITSUBISHI ELECTRIC CORPORATION, Tokyo (JP)

( * ) Notice: Subject to any disclaimer, the term of this patent is extended or adjusted under 35 U.S.C. 154(b) by 136 days.

(21) Appl. No.: 17/907,985

(22) PCT Filed: Apr. 24, 2020

(86) PCT No.: PCT/JP2020/017785
§ 371 (c)(1),
(2) Date: Aug. 30, 2022

(87) PCT Pub. No.: WO2021/215004
PCT Pub. Date: Oct. 28, 2021

(65) Prior Publication Data
US 2023/0105055 A1 Apr. 6, 2023

(51) Int. Cl.
*H02S 30/20* (2014.01)
*B64G 1/22* (2006.01)
(Continued)

(52) U.S. Cl.
CPC ............. *H02S 30/20* (2014.12); *B64G 1/222* (2013.01); *B64G 1/443* (2013.01); *H02S 20/30* (2014.12)

(58) Field of Classification Search
CPC ... B64G 1/443; B64G 1/22–229; H02S 30/20; H02S 20/30
See application file for complete search history.

(56) References Cited

U.S. PATENT DOCUMENTS 3,473,758 A * 10/1969 Valentijn ................. B64G 1/443
244/172.6
5,018,915 A * 5/1991 Inokuma ................. B23Q 1/015
409/231
(Continued)

FOREIGN PATENT DOCUMENTS

JP 1-114421 A 5/1989
JP 1-131748 A 5/1989
(Continued)

OTHER PUBLICATIONS

Chung, Carbon Composites (Second Edition) Composites with Carbon Fibers, Nanofibers and Nanotubes 4—Polymer-Matrix Composites: Mechanical Properties and Thermal Performance, p. 218-255, 2017 (Year: 2017).*

(Continued)

*Primary Examiner* — Andrew J Golden
(74) *Attorney, Agent, or Firm* — XSENSUS LLP

(57) ABSTRACT

A solar array wing includes an extension mast to be extended from a wound state, and a support member, around which the extension mast is wound, to support the extension mast after the extension mast is extended. The support member is made of a fiber reinforced composite material. A coefficient of linear expansion of the fiber reinforced composite material, a unit of which is for each degree Celsius, in a direction that is orthogonal to an extension direction of the extension mast, is higher than or equal to $-1\times10^{-6}$ and lower than or equal to $1\times10^{-6}$.

10 Claims, 3 Drawing Sheets

(51) Int. Cl.
*B64G 1/44* (2006.01)
*H02S 20/30* (2014.01)

(56) References Cited

U.S. PATENT DOCUMENTS

| | | | |
|---|---|---|---|
| 2012/0125571 A1 | 5/2012 | Lutz et al. | |
| 2014/0154494 A1 | 6/2014 | Kato et al. | |
| 2014/0326833 A1* | 11/2014 | Spence | B64G 1/443 244/172.7 |
| 2021/0028745 A1 | 1/2021 | Sekine et al. | |

FOREIGN PATENT DOCUMENTS

| | | | |
|---|---|---|---|
| JP | 3-248832 A | 11/1991 | |
| JP | 2978769 B2 | 11/1999 | |
| JP | 2011-246112 A | 12/2011 | |
| JP | 2012-16867 A | 1/2012 | |
| JP | 5622929 B2 | 11/2014 | |
| JP | 2016-16548 A | 2/2016 | |
| WO | 2016/006265 A1 | 1/2016 | |
| WO | WO-2018093761 A1 * | 5/2018 | B64G 1/222 |
| WO | 2019/230019 A1 | 12/2019 | |

OTHER PUBLICATIONS

Gabrion et al, About the thermomechanical behaviour of a carbon fibre reinforced high-temperature thermoplastic composite. Composites Part B: Engineering, 2016, 95, pp. 386-394. (Year: 2016).*
Chemical Book Resin epoxy property, <https://www.chemicalbook.com/ChemicalProductProperty_US_CB2701716.aspx> 2017 (Year: 2017).*
Partial supplementary European search report dated on May 11, 2023, in corresponding European patent Application No. 20932084.5, 13 pages.
International Search Report and Written Opinion mailed on Aug. 4, 2020, received for PCT Application PCT/JP2020/017785, filed on Apr. 24, 2020, 12 pages including English Translation.
Extended European search report issued on Aug. 11, 2023, in corresponding European patent Application No. 20932084.5, 11 pages.
Henk J. Cruijssen, "Solar Array Designs for Columbus Elements", Proceedings of the European Space Power Conference, vol. 2, Oct. 2-6, 1989, Madrid, Spain, pp. 573-584, total 13 pages.

* cited by examiner

SOLAR ARRAY WING

CROSS-REFERENCE TO RELATED APPLICATION

The present application is based on PCT filing PCT/JP2020/017785, filed Apr. 24, 2020, the entire contents of which are incorporated herein by reference.

TECHNICAL FIELD

The present disclosure relates to a solar array wing.

BACKGROUND ART

Due to an artificial satellite needing a large amount of power, increase in size of the solar array wing is in demand.

In recent years, a method in which a power generation panel is stored cylindrically, the power generation panel is expanded by extending a mast, and the power generation panel is retained by the mast, is being considered. Utilizing carbon fiber reinforced plastic (CFRP) for the mast is being considered.

In this method, a discrepancy in extension directions of both the power generation panel and the mast leads to damage to the power generation panel.

Consequently, an angle error in the extension direction and an angle change in the extension direction are necessary to be reduced.

Reducing a thermal expansion difference between the mast and a support member to which the mast is joined is effective in reducing the angle error in the extension direction and the angle change in the extension direction. This thermal expansion difference occurs due to a temperature change. Reducing a clearance in a joining part between the mast and the support member is effective in reducing the angle error in the extension direction and the angle change in the extension direction.

Patent Literature 1 discloses a joining method in which an insert part of a metal cylindrical body is inserted into a CFRP cylindrical body, and both cylindrical bodies are adhered to each other by an adhesive.

CITATION LIST

Patent Literature

Patent Literature 1: JP H01-114421 A

SUMMARY OF INVENTION

Technical Problem

Measures such as reducing the thermal expansion difference between the mast and the support member, and reducing the clearance in the joining part between the mast and the support member, are effective in reducing the angle error and the angle change in the extension direction of both the power generation panel and the mast.

In a current situation, however, there is no technology that enables these measures. Instead, when rigidity of the support member is increased by making a structure of the support member larger, weight of the support member increases.

An issue such as below exists in the joining method disclosed in Patent Literature 1.

Since a thermal expansion difference exists between CFRP and metal, a shape of a joining part between a CFRP member and a metal member changes according to a temperature change. Consequently, an extension direction of the CFRP member changes according to a change in environment. The extension direction of the CFRP member can change as much as an amount of clearance between the CFRP member and the metal member. These changes become factors for an angle error occurring in the extension direction.

The present disclosure aims to make an angle error between an extension direction of a power generation panel and an extension direction of an extension mast smaller.

Solution to Problem

A solar array wing according to the present disclosure includes:
  an extension mast to be extended from a wound state; and
  a support member, around which the extension mast is wound, to support the extension mast after the extension mast is extended.

The support member is made of a fiber reinforced composite material.

A coefficient of linear expansion of the fiber reinforced composite material, a unit of which is for each degree Celsius, in a direction that is orthogonal to an extension direction of the extension mast, is higher than or equal to $-1 \times 10^{-6}$ and lower than or equal to $1 \times 10^{-6}$.

Advantageous Effects of Invention

According to the present disclosure, since deformation of a support member is reduced, an angle error between an extension direction of a solar array bracket (a power generation panel) and an extension direction of an extension mast can be made smaller.

DESCRIPTION OF EMBODIMENTS

Figure 1:
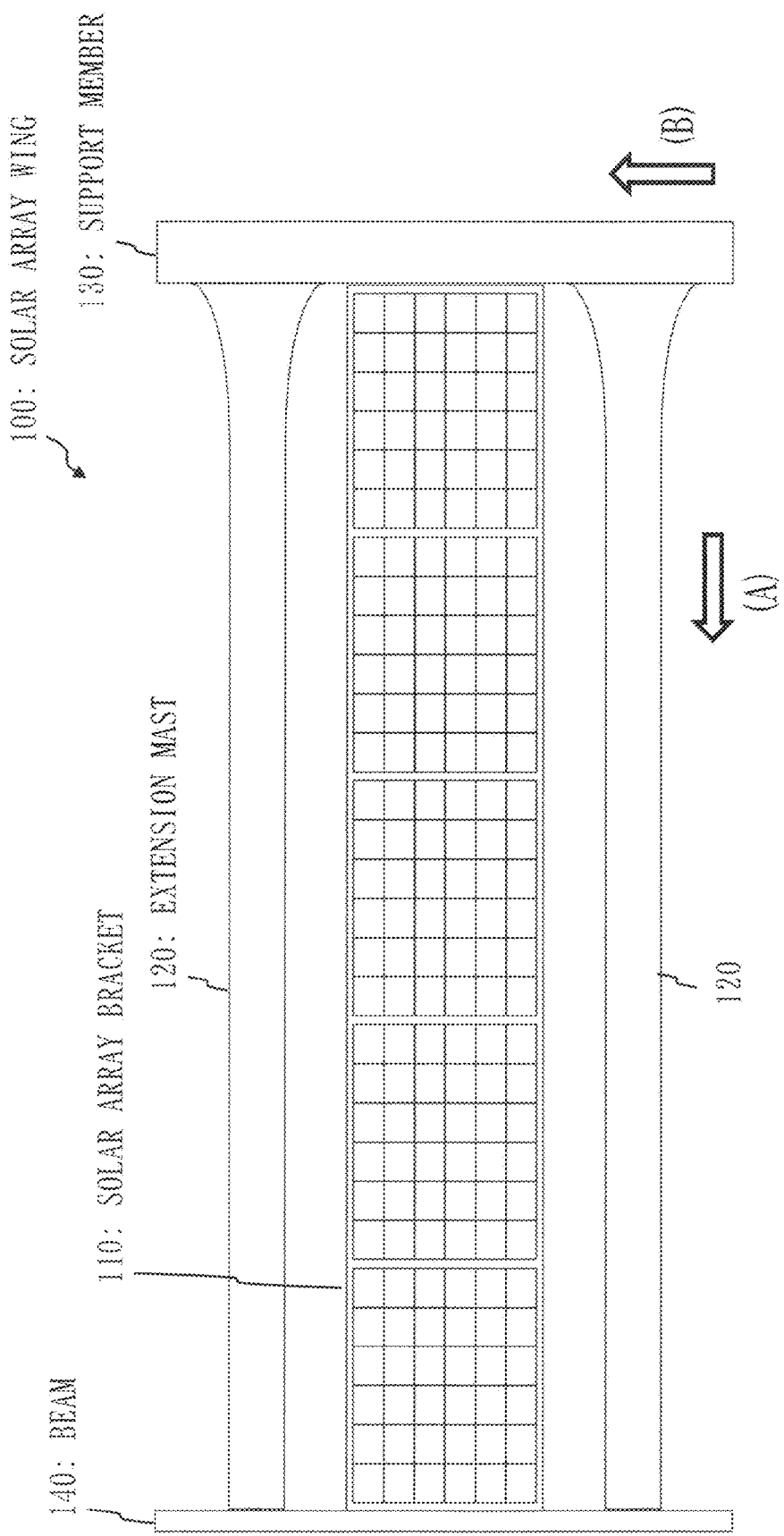
FIG. 1 is a schematic view of a solar array wing 100 according to Embodiment 1.

In the embodiments and in the drawings, the same reference signs are added to the same elements or corresponding elements. Description of elements having the same reference signs added as the elements described will be suitably omitted or simplified.

Embodiment 1

A solar array wing 100 will be described based on FIG. 1 to FIG. 4.

A configuration of the solar array wing 100 will be described based on FIG. 1. FIG. 1 illustrates the solar array wing 100 in an extended state.

The solar array wing 100 includes a solar array bracket 110, two extension masts 120, a support member 130, and a beam 140.

The solar array bracket 110 is a flexible power generation panel. The power generation panel is also called a solar cell panel.

The extension mast 120 is a mast made of carbon fiber reinforced plastic (CFRP).

The extension mast 120 is extended from a state in which the extension mast 120 is wound around the support member 130.

The two extension masts 120 are positioned one on each side of the solar array bracket 110 in a width direction (direction (B)) of the solar array bracket 110.

The support member 130 is a member for supporting the solar array bracket 110 and the two extension masts 120.

The support member 130 forms a columnar shape. Specifically, the support member 130 forms a cylindrical shape.

One end part of the solar array bracket 110 in a length direction (direction (A)) of the solar array bracket 110 is attached to the support member 130. One end part of the extension mast 120 in a length direction (direction (A)) of each extension mast 120 is attached to the support member 130.

The beam 140 is a member for supporting the solar array bracket 110 and the two extension masts 120.

Another end part of the solar array bracket 110 in the length direction of the solar array bracket 110 is attached to the beam 140. Another end part of the extension mast 120 in the length direction of each extension mast 120 is attached to the beam 140.

The solar array wing 100 is attached mainly to a spacecraft such as an artificial satellite and used.

At a time of storing the solar array wing 100, the solar array bracket 110 and the two extension masts 120 are wound around the support member 130. That is, the solar array bracket 110 and the two extension masts 120 are stored in a shortened state where the solar array bracket 110 and the two extension masts 120 are wound around the support member 130.

At a time of extending the solar array wing 100, the beam 140 is moved in a direction away from the support member 130. As a result, the solar array bracket 110 and the two extension masts 120 are extended.

Arrow (A) indicates an extension direction of the solar array bracket 110 and the two extension masts 120.

Arrow (B) indicates a direction that is orthogonal to the extension direction that arrow (A) indicates and a length direction of the support member 130.

Figure 2:
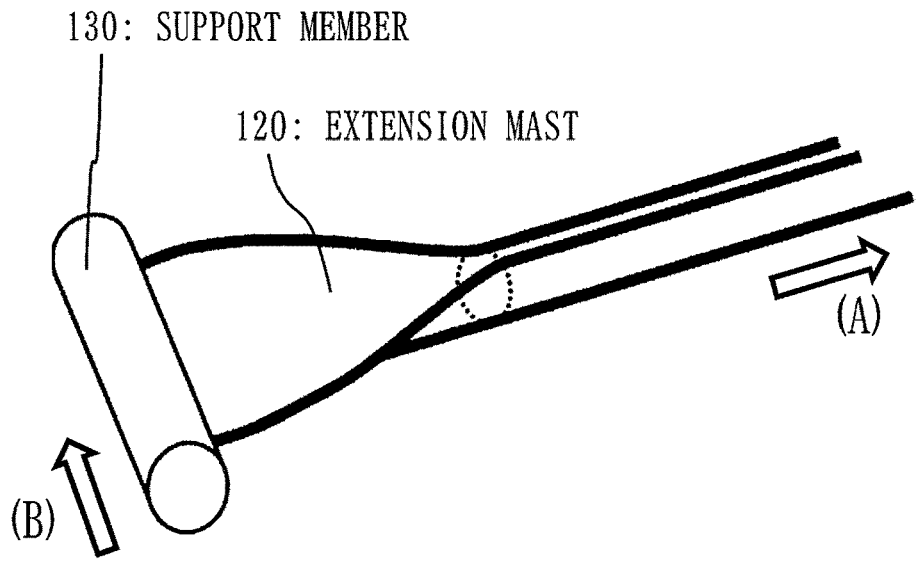
FIG. 2 is a perspective view illustrating an end part of a support member 130 according to Embodiment 1.

A material for the support member 130 will be described based on FIG. 2. FIG. 2 is a perspective view illustrating an end part of the support member 130.

The extension mast 120 is wound around the support member 130 at a time of storage. At this time, the extension mast 120 is elastically deformed in a way to extend in an axial direction (direction (B)) of the support member 130.

The extension mast 120 is extended from a wound state at a time of extension. At this time, the extension mast 120 is elastically deformed in a way to extend in an extension direction (direction (A)).

By such elastic deformation, repeatedly performing storing of the extension mast 120 and extending of the extension mast 120 will be possible. Consequently, the extension mast 120 has an area where a transition in shape happens in vicinity of the support member 130.

There is a case where a local shape change occurs in the support member 130 according to a temperature distribution inside the support member 130. In such a case, a difference occurs between the extension direction of the extension mast 120 and an extension direction of the solar array bracket 110. And, there is risk of the difference in the extension directions leading to damage to the solar array bracket 110.

Consequently, in a winding axial direction (direction (B)), it is necessary to reduce deformation in the support member 130 that is associated with a temperature change. That is, in the direction (direction (B)) that is orthogonal to the extension direction (direction (A)) of the extension mast 120, closer a coefficient of linear expansion of the material for the support member 130 is to 0, the more preferable.

In space environment, a temperature difference occurs with partial solar radiation and the like as factors.

When having a range of the temperature difference that can occur in the space environment as a condition, it is preferable that the coefficient of linear expansion of the material for the support member 130 is a value within a range that is higher than or equal to $-1 \times 10^{-6}$ [/° C.] and lower than or equal to $1 \times 10^{-6}$ [/° C.].

The range that is higher than or equal to $-1 \times 10^{-6}$ [/° C.] and lower than or equal to $1 \times 10^{-6}$ [/° C.] is called "application range".

"° C." means degree Celsius Degree Celsius is also called, simply, "degree".

"/° C." means "per degree", that is, "for each degree Celsius."

In a case where the coefficient of linear expansion of the material for the support member 130 is a value within the application range, damage to the solar array bracket 110 can be prevented.

In a case where the coefficient of linear expansion of the material for the support member 130 is a value outside the application range, a deformation amount of the support member 130 becomes large when the temperature change occurs. For example, when the support member 130 moves from a shade area and begins to receive solar radiation, large deformation occurs in the support member 130 because of a partial rise in a temperature of the support member 130. And, the large deformation of the support member 130 leads to damage to the solar array bracket 110.

Therefore, the support member 130 is made of a material that has the coefficient of linear expansion that is higher than or equal to $-1 \times 10^{-6}$[/° C.] and lower than or equal to $1 \times 10^{-6}$[/° C.]. A specific material is a fiber reinforced composite material.

The fiber reinforced composite material is a material made by combining a reinforced fiber and a base material (matrix). By adjusting an orientation of the reinforced fiber, it is possible to make the coefficient of linear expansion a value within the range that is higher than or equal to $-1 \times 10^{-6}$[/° C.] and lower than or equal to $1 \times 10^{-6}$[/° C.].

Figure 3:
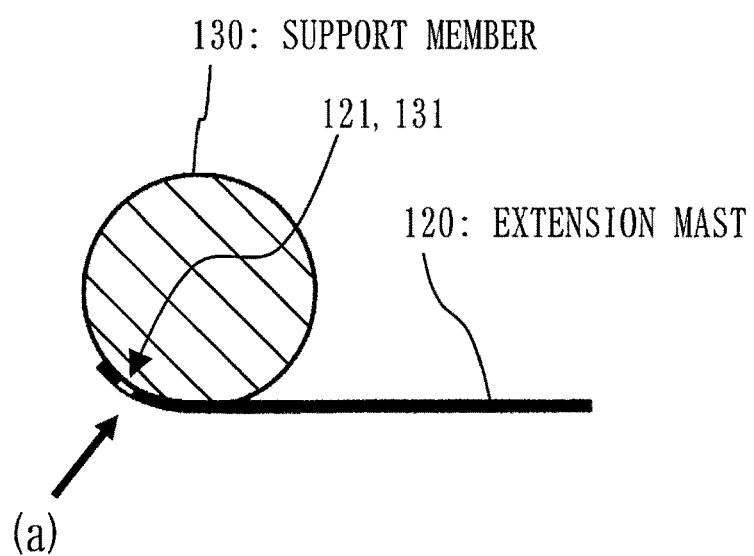
FIG. 3 is a cross-sectional view of a joining portion between the support member 130 and an extension mast 120 according to Embodiment 1.
Figure 4:
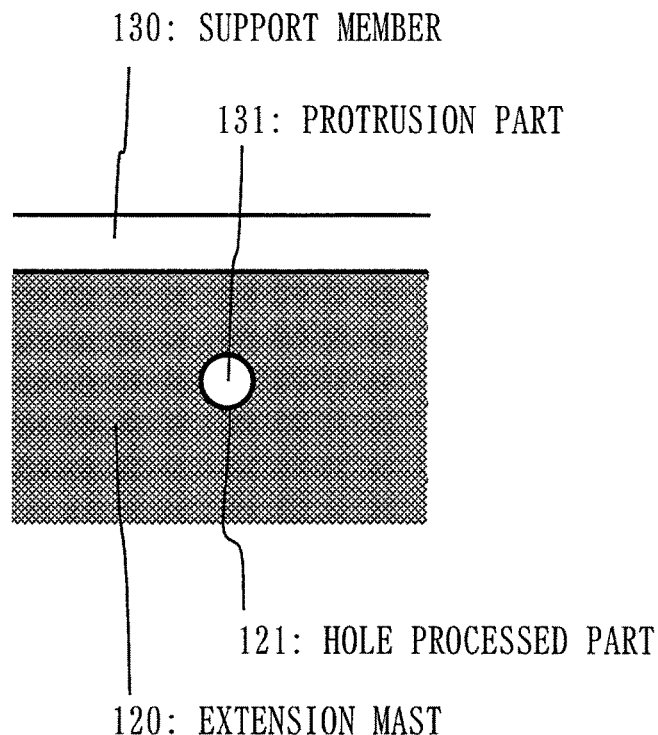
FIG. 4 is an enlarged view of the joining portion between the support member 130 and the extension mast 120 according to Embodiment 1.

A method to join the extension mast 120 to the support member 130 will be described based on FIG. 3 and FIG. 4. FIG. 3 illustrates a cross-section of a joining portion between the support member 130 and the extension mast 120 viewed from the axial direction of the support member 130. FIG. 4 illustrates, in an enlarged manner, the joining portion viewed from a direction of arrow (a) in FIG. 3.

The extension mast 120 has a hole processed part 121 near an end. The hole processed part 121 is a portion that is processed to have a hole made.

The support member 130 has a protrusion part 131. The protrusion part 131 is a portion that is protruded.

The protrusion part 131 is plugged, without a space, into the hole processed part 121. That is, the protrusion part 131 is filled into the hole processed part 121. As a result, the extension mast 120 is joined to the support member 130.

There may be a plurality of sets of the hole processed part 121 and the protrusion part 131. The number of sets of the hole processed part 121 and the protrusion part 131 can be designed according to a size and the like of the solar array wing 100.

The protrusion part 131 is shaped such that a cross-section is smaller than the hole processed part 121 to make the protrusion part 131 possible to be inserted into the hole processed part 121.

The protrusion part 131 is shaped such that a volume is equal to a capacity of the hole processed part 121 to make the protrusion part 131 possible to be plugged, without a space, into the hole processed part 121. Specifically, the protrusion part 131 is shaped somewhat longer than a depth of the hole processed part 121 (that is, a thickness of the extension mast 120).

The protrusion part 131 is inserted into the hole processed part 121 and the protrusion part 131 is locally heated to couple the extension mast 120 to the support member 130.

Then, in the protrusion part 131, a structure of the matrix in the fiber reinforced composite material changes by heating such that viscosity of the fiber reinforced composite material is lowered. And, the protrusion part 131 is deformed and becomes a same shape as the hole processed part 121. That is, the protrusion part 131 is filled into the hole processed part 121.

As a result, the protrusion part 131 is plugged, without a space, into the hole processed part 121, and the extension mast 120 is coupled to the support member 130.

Heating the protrusion part 131 locally is enabled by making a high-temperature object come in contact with the protrusion part 131. The high-temperature object is an object with a temperature that is high. Specifically, the temperature of the high-temperature object is higher than a melting point of the matrix in the fiber reinforced composite material.

A simple and easy method is a method to blow high-temperature gas onto the protrusion part 131 using a hairdryer and the like.

The high-temperature object may be any one of a gas, a liquid, or a solid, regardless of type. A solid that is the high-temperature object, for example, is a tool that is heated to a high-temperature. That is, the tool and the like that are heated to a high-temperature may be made to come in contact with the protrusion part 131.

The fiber reinforced composite material that is to be the material for the support member 130 will be supplemented.

When a temperature of vicinity of the hole processed part 121 of the extension mast 120 (that is, the hole processed part 121's surroundings) at a time of heating the protrusion part 131 becomes higher than or equal to a glass-transition temperature of CFRP, a material for the extension mast 120, strength of the vicinity of the hole processed part 121 is noticeably lowered.

Therefore, a fiber reinforced composite material such as the following is used for the support member 130. A temperature at which the structure of the matrix changes such that the viscosity of the fiber reinforced composite material is lowered is below the glass-transition temperature of CFRP, the material for the extension mast 120.

The temperature at which a structural change of the matrix and lowering of the viscosity of the fiber reinforced composite material happen is called "applicable temperature". The applicable temperature is equivalent to the melting point of the matrix.

For example, in a case where the glass-transition temperature of CFRP is 150° C., the applicable temperature of the fiber reinforced composite material is necessary to be below 150° C.

There is a possibility where the glass-transition temperature of CFRP used for the extension mast 120 becomes lower than a standard temperature (for example, 150° C.) with unevenness in quality and the like of CFRP as causes. Consequently, in a case where a difference between the applicable temperature of the fiber reinforced composite material and the standard temperature of CFRP is small, there is a possibility that the strength of the vicinity of the hole processed part 121 is lowered.

Therefore, it is preferable that a difference between the applicable temperature of the fiber reinforced composite material used for the support member 130 and the standard temperature of CFRP used for the extension mast 120 is higher than or equal to 10° C.

The difference between the applicable temperature of the fiber reinforced composite material used for the support member 130 and the standard temperature of CFRP used for the extension mast 120 is called "temperature difference".

There is no upper limit to the temperature difference. Since the applicable temperature of the fiber reinforced composite material, however, is low, when the temperature difference is too big, the structural change of the matrix in the fiber reinforced composite material and the lowering of the viscosity of the fiber reinforced composite material happen at a time of use in the space environment that there is a possibility of the solar array wing 100 being damaged.

Therefore, it is preferable that the applicable temperature of the fiber reinforced composite material is higher than or equal to 80° C.

In a case where metal is used for the matrix in the fiber reinforced composite material, when a temperature of the matrix exceeds a melting point of the metal, the matrix is liquefied. That is, the structural change of the matrix and the lowering of the viscosity of the fiber reinforced composite material happen.

In a case where resin is used for the matrix in the fiber reinforced composite material, when the temperature of the matrix exceeds a glass-transition temperature of the resin, the matrix is gelled. That is, the structural change of the matrix and the lowering of the viscosity of the fiber reinforced composite material happen.

The glass-transition temperature of CFRP is typically below 300° C. Consequently, the glass-transition temperature of CFRP is below melting points of many metals.

Therefore, using metal for the matrix in the fiber reinforced composite material is preferable. The metal to be used may be a single component metal or may be an alloy. Specific examples of the single component metal are lead (Pb), tin (Sn), bismuth (Bi), cadmium (Cd), copper (Cu), cesium (Cs), gallium (Ga), zinc (Zn), indium (In), and the like.

Generally, metal has higher rigidity than resin. Therefore, using metal for the matrix in the fiber reinforced composite material is preferable to increase rigidity of the support member 130.

In a case where the support member 130 being lightweight is to be considered important, using resin for the matrix in the fiber reinforced composite material is preferable.

Both metal and resin may be used for the matrix in the fiber reinforced composite material.

Effect of Embodiment 1

According to Embodiment 1, the solar array wing 100 with the solar array bracket 110 that is not prone to damage can be achieved. Specifically, the solar array wing 100 with an extension direction difference between the extension mast 120 and the solar array bracket 110 that is small is achieved. Such solar array wing 100 is achieved by the support member 130. The support member 130 is possible to reduce the extension direction difference between the extension mast 120 and the solar array bracket 110. In the support member 130, there is no clearance between the protrusion part 131 and the hole processed part 121. A thermal expansion difference between the support member 130 (fiber reinforced composite material) and the extension mast 120 (CFRP) is small.

Embodiment 2

Figure 5:
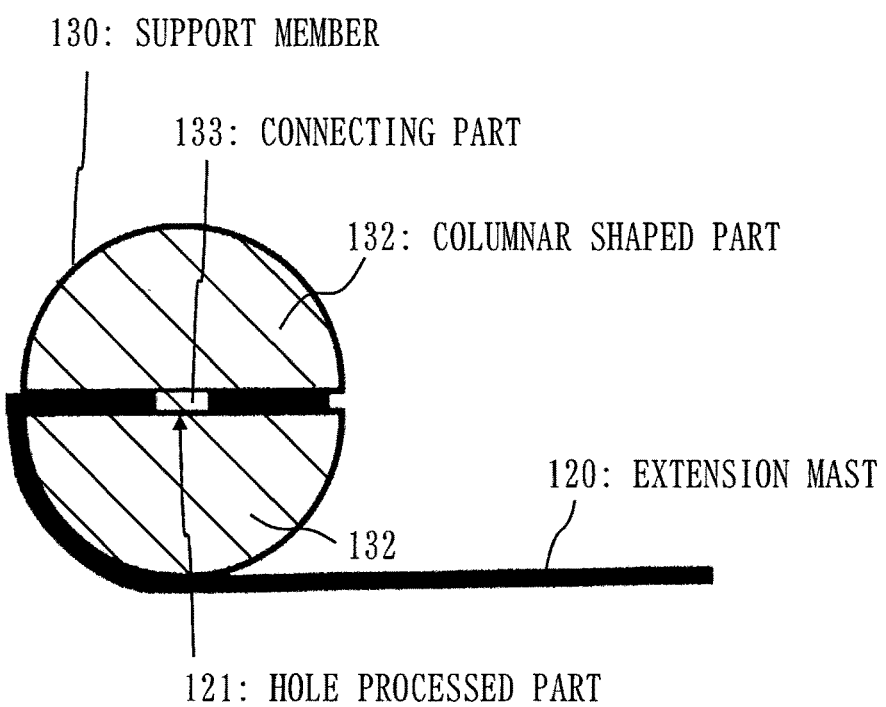
FIG. 5 is a cross-sectional view of a joining portion between a support member 130 and an extension mast 120 according to Embodiment 2.

With regard to a form of a support member 130, differing points from Embodiment 1 will mainly be described based on FIG. 5.

An example of a structure of the support member 130 will be described based on FIG. 5. FIG. 5 illustrates a cross-section of a joining portion between the support member 130 and the extension mast 120 viewed from an axial direction of the support member 130.

The support member 130 includes two columnar shaped parts 132 and a connecting part 133. The support member 130 is made using a fiber reinforced composite material as described in Embodiment 1.

The two columnar shaped parts 132 are connected by the connecting part 133.

The columnar shaped part 132 is a member that forms a columnar shape having a plane parallel to the axial direction (length direction). For example, each columnar shaped part 132 forms a semi-cylindrical shape, and is linked, on a plane side, to another columnar shaped part 132 by the connecting part 133.

The connecting part 133 is a member to connect the two columnar shaped parts 132. Specifically, the connecting part 133 connects the planes of the two columnar shaped parts 132 to each other. The connecting part 133 is inserted into the hole processed part 121 and utilized as the protrusion part 131. The connecting part 133 forms a columnar shape.

In a preliminary stage of joining the support member 130 and the extension mast 120, the connecting part 133 may be joined to one columnar shaped part 132 or may be separated from each columnar shaped part 132. That is, the connecting part 133 may be integrated with the columnar shaped part 132, or may be an individual separate from the columnar shaped part 132. By a protrusion part being provided on each of the two columnar shaped parts 132, the connecting part 133 may be configured of the two protrusion parts.

Since the connecting part 133 is to be utilized as the protrusion part 131, a cross-section of the connecting part 133 is smaller than the hole processed part 121, and a volume of the connecting part 133 is equal to the capacity of the hole processed part 121.

The connecting part 133 is inserted into the hole processed part 121 provided near the end of the extension mast 120, and the two columnar shaped parts 132 sandwich a neighborhood of the end of the extension mast 120. That is, the two columnar shaped parts 132 sandwich the hole processed part 121's surroundings.

Then, the connecting part 133 is locally heated, a structural change of a matrix and lowering of viscosity of a fiber reinforced composite material happen in the connecting part 133, and the connecting part 133 is deformed and plugged, without a space, into the hole processed part 121. That is, the connecting part 133 is filled into the hole processed part 121.

As a result, the extension mast 120 is joined to the support member 130.

Heating the connecting part 133 locally, for example, is performed by conducting electricity to the extension mast 120.

By conducting electricity to the extension mast 120, heat is generated in CFRP, the material for the extension mast 120, and the heat that is generated is conducted to the connecting part 133. As a result, the connecting part 133 is heated.

In a case where the fiber reinforced composite material, the material for the support member 130, is a conductor, heating the connecting part 133 locally can be performed by conducting electricity to the columnar shaped part 132.

By conducting electricity to the columnar shaped part 132, heat is generated in the columnar shaped part 132, and the generated heat is conducted to the connecting part 133. As a result, the connecting part 133 is heated.

In a case where the fiber reinforced composite material, the material for the support member 130, does not conduct enough electricity, the connecting part 133 can be heated by adding a metal wire to the support member 130 and conducting electricity through the metal wire. The metal wire may be buried in the support member 130, or may be wired on a surface of the support member 130.

Effect of Embodiment 2

According to Embodiment 2, since the hole processed part 121's surroundings are sandwiched by the two columnar shaped parts 132, strength in joining of the support member 130 and the extension mast 120 can be increased.

Supplement to Embodiments

Each embodiment is exemplification of a preferred mode, and is not intended to limit the technical scope of the present disclosure.

REFERENCE SIGNS LIST

100: solar array wing; 110: solar array bracket; 120: extension mast; 121: hole processed part; 130: support member; 131: protrusion part; 132: columnar shaped part; 133: connecting part; 140: beam.

The invention claimed is:

1. A solar array wing comprising:
an extension mast to be extended from a wound state; and
a support member, around which the extension mast is wound, to support the extension mast after the extension mast is extended, wherein
the support member is made of a fiber reinforced composite material,
a coefficient of linear expansion of the fiber reinforced composite material, a unit of which is for each degree Celsius, in a direction that is orthogonal to an extension direction of the extension mast, is higher than or equal to $-1\times10^{-6}$ and lower than or equal to $1\times10^{-6}$,
the extension mast is made of carbon fiber reinforced plastic, and
in the fiber reinforced composite material of the support member, a matrix having a melting point below a glass-transition temperature of the carbon fiber reinforced plastic of the extension mast is used.

2. The solar array wing according to claim 1, wherein the support member has a protrusion part, and
the extension mast has a hole processed part in which a hole is made and into where the protrusion part is inserted and is joined to the support member by the protrusion part being plugged, without a space, into the hole processed part.

3. The solar array wing according to claim 1, wherein the support member includes;
two columnar shaped parts that form columnar shapes having planes parallel to an axial direction of the support member, and
a connecting part that connects the planes of the two columnar shaped parts to each other.

4. The solar array wing according to claim 3, wherein
the extension mast has a hole processed part in which a hole is made and into where the connecting part is inserted, and
the extension mast is joined to the support member by the connecting part being plugged, without a space, into the hole processed part.

5. The solar array wing according to claim 3, wherein the extension mast is disposed between the two columnar shaped parts.

6. The solar array wing according to claim 3, wherein the extension mast is disposed between the planes of the two columnar shaped parts.

7. The solar array wing according to claim 2, wherein the protrusion part of the support member is formed of the fiber reinforced composite material of the support member.

8. The solar array wing according to claim 3, wherein the connecting part is disposed between the two columnar shaped parts.

9. The solar array wing according to claim 3, wherein the connecting part is disposed between the planes of the two columnar shaped parts.

10. The solar array wing according to claim 3, wherein the connecting part of the support member is formed of the fiber reinforced composite material of the support member.

* * * * *